United States Patent
Ben-Yehuda et al.

(10) Patent No.: US 8,055,951 B2
(45) Date of Patent: Nov. 8, 2011

(54) SYSTEM, METHOD AND COMPUTER PROGRAM PRODUCT FOR EVALUATING A VIRTUAL MACHINE

(75) Inventors: Shmuel Ben-Yehuda, Haifa (IL); Richard E. Harper, Chapel Hill, NC (US); Dan Pelleg, Haifa (IL); Lisa F. Spainhower, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 11/733,253

(22) Filed: Apr. 10, 2007

(65) Prior Publication Data

US 2008/0256533 A1    Oct. 16, 2008

(51) Int. Cl.
*G06F 11/00* (2006.01)
(52) U.S. Cl. ............... 714/47.1; 714/2; 714/25; 714/48
(58) Field of Classification Search ............ 714/25, 714/47, 2, 47.1, 48
See application file for complete search history.

(56) References Cited

U.S. PATENT DOCUMENTS

| | | | |
|---|---|---|---|
| 4,674,038 A | 6/1987 | Brelsford et al. | |
| 5,437,033 A | 7/1995 | Inoue et al. | |
| 5,805,790 A | 9/1998 | Nota et al. | |
| 6,795,966 B1 | 9/2004 | Lim et al. | |
| 7,124,327 B2 | 10/2006 | Bennett et al. | |
| 7,620,953 B1 * | 11/2009 | Tene et al. | 718/104 |
| 2005/0081199 A1 | 4/2005 | Traut | |
| 2005/0144537 A1 * | 6/2005 | Cataltepe et al. | 714/47 |
| 2005/0160151 A1 | 7/2005 | Rawson | |
| 2006/0195715 A1 * | 8/2006 | Herington | 714/4 |
| 2006/0200819 A1 | 9/2006 | Cherkasova et al. | |
| 2006/0206892 A1 | 9/2006 | Vega et al. | |
| 2007/0150895 A1 * | 6/2007 | Kurland | 718/102 |
| 2007/0283186 A1 * | 12/2007 | Madnani et al. | 714/6 |
| 2008/0059726 A1 * | 3/2008 | Rozas et al. | 711/156 |
| 2008/0163370 A1 * | 7/2008 | Maynard | 726/22 |

OTHER PUBLICATIONS

Veeam, "Veeam Monitor for VMware", URL: http://www.veeam.com/veeam_monitor_5_0_datasheet_ds.pdf. © 2011 Veeam Software (printed on Feb. 7, 2011).

* cited by examiner

*Primary Examiner* — Scott Baderman
*Assistant Examiner* — Sarai Butler

(57) ABSTRACT

A method for evaluating a virtual machine, the method includes: monitoring, using an out of band monitor, information exchanged between the virtual machine and a hypervisor; and evaluating a state of the virtual machine by applying a statistical classification process to at least a portion of the monitored information.

29 Claims, 3 Drawing Sheets

SYSTEM, METHOD AND COMPUTER PROGRAM PRODUCT FOR EVALUATING A VIRTUAL MACHINE

FIELD OF THE INVENTION

The present invention relates to a method, a system and a computer program product for evaluating a virtual machine.

BACKGROUND OF THE INVENTION

Computer hardware can be virtualized by inserting a controlling mechanism (termed hypervisor or virtual machine monitor) between the physical hardware and the operating system (OS). Such virtualization can be used for server consolidation, OS and application testing and debugging, reliability and survivability. Virtualization systems for PC-class hardware are becoming increasingly common.

A major challenge arising in virtualized environments is management, especially in the field of consolidation. In such settings, dozens or hundreds of virtualized machines (also termed guests) could be running under a single physical machine. Any one of the virtual machines could be failing or exhibiting degraded performance.

In some cases, the virtual machines, and especially guest operating systems, can not be modified to include a virtual machine.

There is a need to provide efficient methods, computer program products and a system for evaluating a virtual machine.

SUMMARY OF THE PRESENT INVENTION

There is provided, in accordance with an embodiment of the present invention, a method for evaluating a virtual machine, the method includes: monitoring, using an out of band monitor, information exchanged between the virtual machine and a hypervisor; and evaluating a state of the virtual machine by applying a statistical classification process to at least a portion of the monitored information.

Conveniently, the monitoring includes monitoring, by an out of band monitor included within the hypervisor, information exchanged between the virtual machine and the hypervisor.

Conveniently, the monitoring includes monitoring information representative of resource utilization by the virtual machine.

Conveniently, the method includes defining state classes by applying a machine learning process and utilizing the state classes during the appliance of the statistical classification process.

Conveniently, the method includes emulating a functional state of the virtual machine and generating a functional state class, by a machine learning entity.

Conveniently, the applying includes defining the state of the virtual machine as being a faulty state or a potentially faulty state if the state of the virtual machine is not in a functional state class.

Conveniently, the method includes amending a fault associated with a faulty state, or with a potentially faulty state, if the state of the virtual machine is faulty or potentially faulty.

Conveniently, the method includes migrating the virtual machine if the state of the virtual machine is faulty or potentially faulty.

Conveniently, the evaluating is responsive to multiple samples of the monitored information acquired during a long monitoring period.

Conveniently, the classification is responsive to statistical characteristics of a long term behavior pattern of the virtual machine.

There is provided, in accordance with another embodiment of the present invention a computer program product. The computer program product includes a computer usable medium including a computer readable program, wherein the computer readable program, when executed on a computer, causes the computer to: perform out of band monitoring of information exchanged between the virtual machine and a hypervisor; and evaluate a state of the virtual machine by applying a statistical classification process to at least a portion of the monitored information.

There is provided, in accordance with yet another embodiment of the present invention a system having virtual machine evaluation capabilities. The system includes: an out of band monitor adapted to monitor information exchanged between the virtual machine and a hypervisor; and a statistical classifier adapted to evaluate a state of the virtual machine by applying a statistical classification process to at least a portion of the monitored information.

There is provided, in accordance with another embodiment of the present invention, a method for providing a service to a customer over a network, the method includes: receiving, over a network, a request from a customer to evaluate a state of a virtual machine; monitoring, using an out of band monitor, information exchanged between the virtual machine and a hypervisor; evaluating a state of the virtual machine by applying a statistical classification process to at least a portion of the monitored information; sending, over a network and to the customer, an indication about the state of the virtual machine.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Conveniently, a state of one or more virtual machines can be evaluated by performing out of band monitoring of information exchanged between the virtual machine and a hypervisor and by applying a statistical classification process that is responsive to monitored information.

Figure 1:
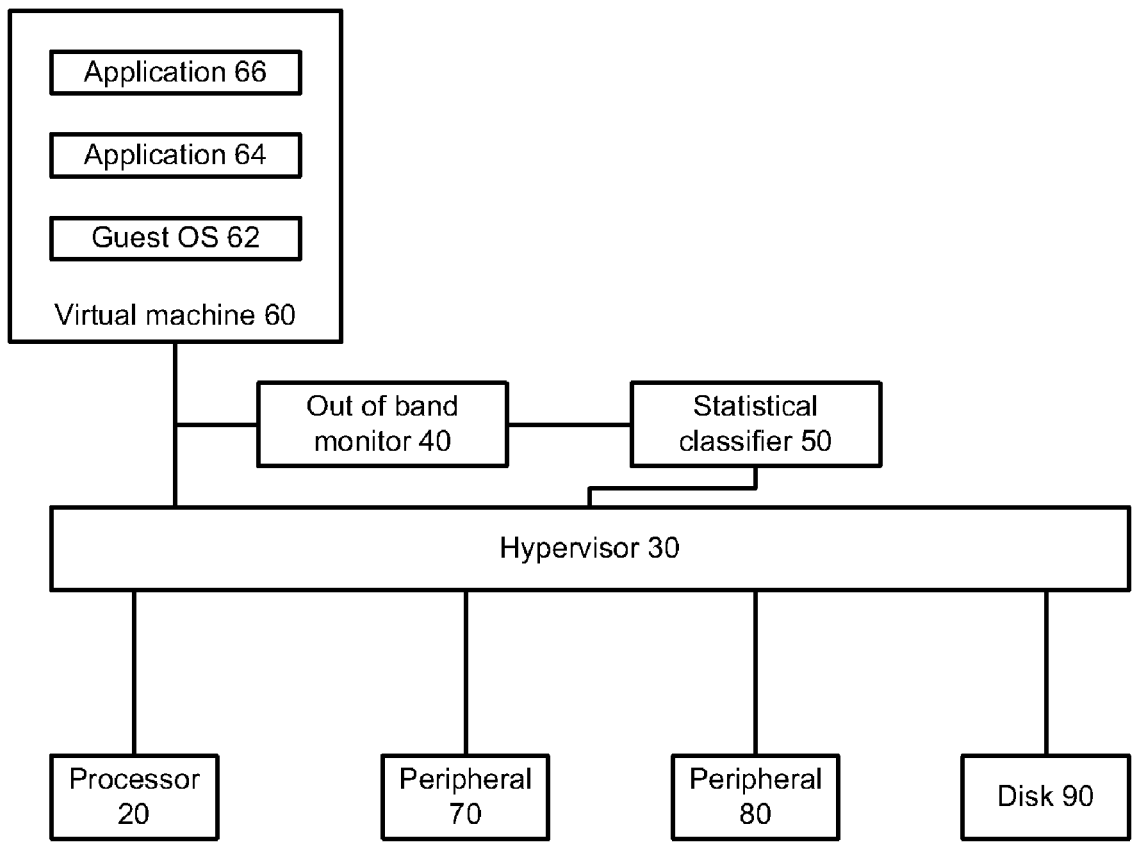
FIG. 1 illustrates a system, according to an embodiment of the invention.

FIG. 1 illustrates system 10 according to an embodiment of the invention.

It is noted that FIG. 1 illustrates both software and hardware components that are included within system 10.

System 10 includes a processor 20, hypervisor 30, out of band monitor 40, statistical classifier 50, virtual machine 60, and various resources such as peripherals 70-80 and disk 90.

Hypervisor 30 runs on processor 20 and can host multiple virtual machines such as virtual machine 60 that includes guest operating system 62 as well as one or more guest applications such as guest applications 64-66. Hypervisor 30 can selectively serve requests of virtual machine 60 to utilize resources such as peripherals 70-80 and disk 90.

For simplicity of explanation it is assumed that out of band monitor 40 is not included within hypervisor 30, although it can be included within hypervisor 30.

The following explanation refers to an evaluation of virtual machine 60 by out of band monitor 40. It is noted that other virtual machines can be hosted by hypervisor 30 (although not illustrated in FIG. 1) and that these other virtual machines can be concurrently monitored, either by out of band monitor 40 or by other out of band monitors that are not illustrated in FIG. 1.

Out of band monitor 40 is adapted to monitor information exchanged between virtual machine 60 and hypervisor 30. It can be adapted to detect requests for resource allocations, responses to such requests (approval/refusal), as well as actual usage of various resources. Out of band monitor 40 can also monitor network traffic, as well as other indications representative of the state of the virtual machine operation such as temperature, power consumption and the like. Out of band monitor 40 is not included within virtual machine 60. Conveniently, out of band monitor 40 can perform the monitoring without any assistance from virtual machine 60. Virtual machine 60 is not necessarily aware of the monitoring operations performed by out of band monitor 40. Out of band monitoring can be used when virtual machine 60 should not be altered to enable the monitoring.

Out of band monitor 40 can apply various monitoring techniques including periodical monitoring, continuous monitoring, pseudo random monitoring, as well as other well known monitoring techniques. Conveniently, it samples the information exchanges between virtual machine 60 and hypervisor 30 to provide information samples.

Statistical classifier 50 is connected to out of band monitor 40. It receives monitored information (such as information samples) or data representative of the sampled information and can evaluate the state of the virtual machine by applying a statistical classification process to at least a portion of the monitored information.

Conveniently, the statistical classification process is based upon multiple classes that are defined during a machine learning process. After these classes are defined the statistical classifier can evaluate the state of virtual machine 60 based upon the monitored information and the classes.

According to an embodiment of the invention system 10 and especially statistical classifier 50 can apply a machine learning process in order to define the state classes.

A state class can reflect a long term behavior pattern of the virtual machine.

Conveniently, the machine learning process is a supervised learning process during which a functional virtual machine is emulated, out of band monitor 40 sends monitored information to the statistical monitor that in turn defines a functional class. If, for example, virtual machines can operate in different functional modes or virtual machines of different types are expected to interface with hypervisor 30 then multiple supervised learning process iterations should be executed, in order to define multiple functional state classes.

According to other embodiments of the invention system 10 and especially statistical classifier 50 can apply another machine learning algorithms such as but not limited to linear classification (such as Fisher's linear discriminant, logistic regression, Naive Bayes classification, perceptron), Quadratic classification, k-nearest neighbor, boosting, decision trees, use neural networks, use Bayesian networks, support vector machines and apply hidden Markov models.

For example, if hypervisor 30 is expected to interface with a virtualized web server, a virtualized file server and a virtualized mail server than the supervised learning process should be applied in order to define a functional web server state class, a functional file server state class and a functional mail server state class.

According to an embodiment of the invention the machine learning process can be applied to define a faulty state class (or faulty state classes), a potentially faulty state class (or potentially faulty state classes) and the like.

Conveniently, anomaly detection techniques can be applied during the evaluation. Thus, if the monitored state of virtual machine 60 does not fit in a predefined state class the statistical classifier 50 can determine that the monitored state is faulty or potentially faulty. It is noted that the state classes can be defined in advance but can also be updated during the monitoring and/or evaluation stages. Thus, the state classes can be updated from time to time, and can be learnt on the fly. Statistical classifier 50 can also apply unsupervised learning, semi-supervised learning, on-line learning and anomaly detection.

Conveniently, the evaluation of the state of virtual machine 60 is based upon monitored information gained during a long time period. During the long time period multiple information samples can be acquired. A long time period can last more than few seconds, but this is not necessarily so.

According to another embodiment of the invention, statistical classifier 50 can receive the state classes instead of defining the state classes. It is noted that statistical classifier 50 can define one or more state classes and also receive one or more state classes.

Conveniently, an expected behavior pattern (also referred to as baseline of a normal behavior) of virtual machine 60 is defined. The monitored information is processed, e.g., by classification, to determine what is the state of virtual machine 50—functional, faulty or possibly faulty.

By monitoring and analyzing behavior patterns of virtual machine 50, system 10 can predict when (or if) virtual machine 60 is going to experience a failure. System 10 can also act in response to an expected failure of virtual machine 60 by performing various acts such as generating an alert, performing a failure preventive step or a failure amending step even before the failure occurs.

The alert can be sent via a resource controlled by hypervisor 30. The alert can be visual and/or vocal.

FIG. 1 illustrates statistical classifier 50 as being logically connected to hypervisor 30. It can send hypervisor 30 a state indication and hypervisor 30 can respond accordingly. It is also noted that statistical classifier 50 can be included in hypervisor 30.

Conveniently, system 10 can amend a failure (or an expected failure) of virtual machine 30 by performing a virtual migration of virtual machine 60.

Conveniently, hypervisor 30 is a Xen hypervisor. Out of band monitor 40 can utilize the Xen tracing capabilities and can export monitored information, sampled monitored information or information representative of the exchanged information to statistical classifier 50.

For example, guest operating system 62 might function while exhibiting a time-varying CPU utilization, which might range over, for example, 30% to 70%, with a variance that might be in the ±20% over some averaging interval. This pattern of utilization could be interpreted as normal behavior by statistical classifier 50. However, if guest operating system 62 were to crash or panic, the CPU utilization would fall to a relatively stable and small value, with a very small variance. Statistical classifier 50 would interpret this pattern as a crash, and invoke a restart action. In another example, if an application executed over virtual machine 60 were to go into an infinite loop, the CPU utilization would jump to 100%, with little or no variance. Again, statistical classifier 50 would interpret this pattern as a loop, and invoke the proper action.

Figure 2:
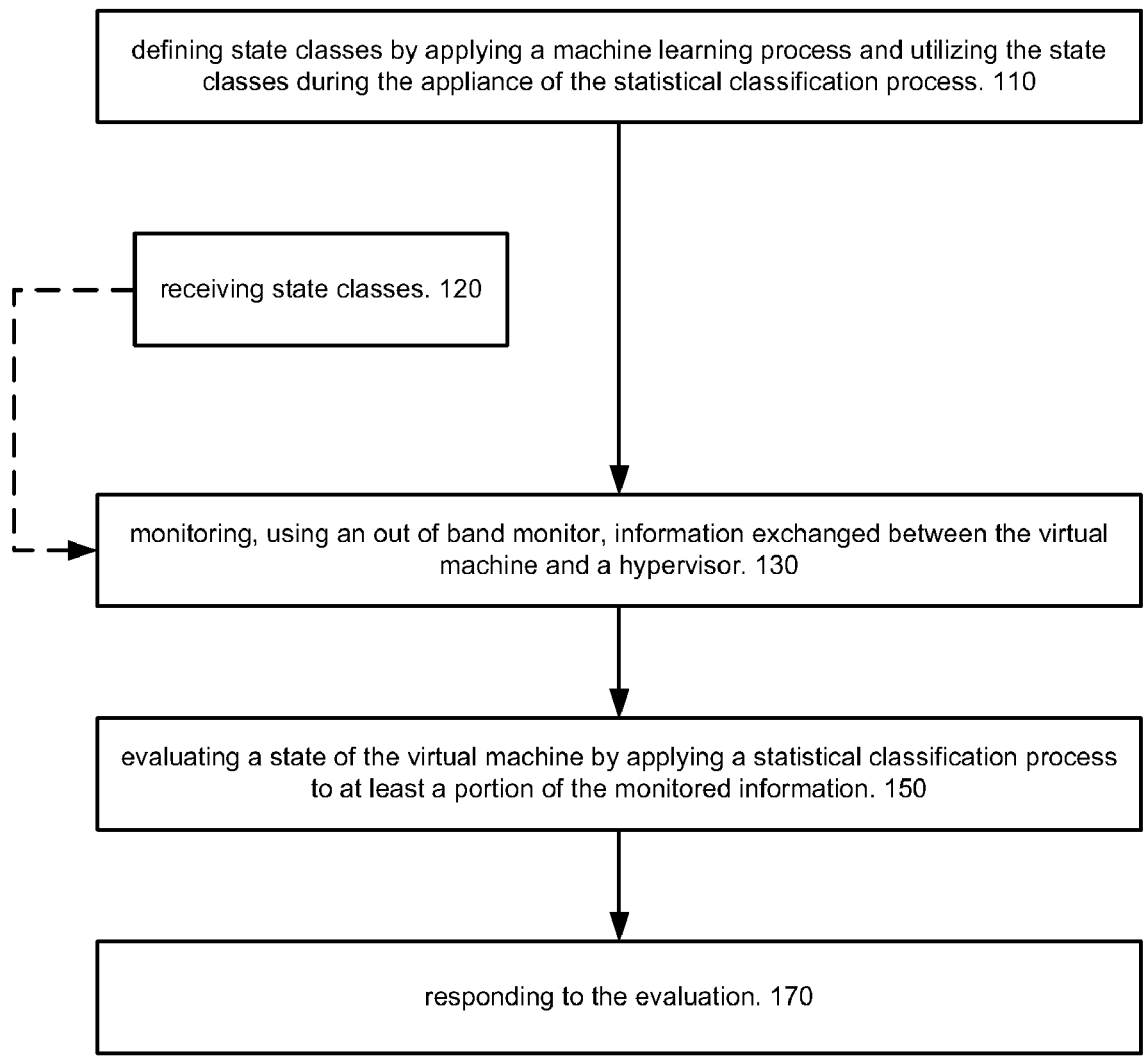
FIG. 2 is a flow chart of a method for evaluating a state of a virtual machine, according to an embodiment of the invention.

FIG. 2 illustrates method 100 for evaluating a virtual machine, according to an embodiment of the invention.

Method 100 starts by stage 110 of defining state classes by applying a machine learning process and utilizing the state classes during the appliance of the statistical classification process. Stage 110 can include applying a supervised learning process. Accordingly, stage 110 can include emulating one or more functional states of the virtual machine and defining a functional state class, by a machine learning entity.

Referring to the example set fourth in FIG. 1, system 10 and especially statistical classifier 50 can apply a machine learning process and define state classes.

According to another embodiment of the invention, method 100 can start by optional stage 120 of receiving state classes. These state classes could have been defined by applying machine learning processes. For clarity of explanation stage 120 is connected by a dashed arrow to stage 130.

It is noted that method 100 can also start by a combination of stage 110 and 120.

Stage 110 is followed by stage 130 of monitoring, using an out of band monitor, information exchanged between the virtual machine and a hypervisor.

Referring to the example set fourth in FIG. 1, out of band monitor 40 can monitor information exchanges between hypervisor 30 and virtual machine 60.

Conveniently, stage 130 can be implemented by one or more out of band monitors that are included within a hypervisor or logically located outside the hypervisor.

Conveniently, stage 130 can include at least one of the following: (i) monitoring information representative of resource utilization by the virtual machine; or (ii) monitoring information representative of requests to utilize a resource.

Stage 130 is followed by stage 150 of evaluating a state of the virtual machine by applying a statistical classification process to at least a portion of the monitored information.

Referring to the example set fourth in FIG. 1, statistical classifier 50 can evaluate the state of virtual machine 60.

Conveniently, stage 150 can include at least one of the following: (i) classifying the state of the virtual machine as being in one out of a functional state class, a faulty state class and a potentially faulty state class; (ii) defining the state of the virtual machine as being a faulty state or a potentially faulty state if the state of the virtual machine is not in a functional state class; (iii) defining the state of a virtual machine as a faulty state if detecting that the virtual machine executes an infinite loop; (iv) evaluating the state of the virtual machine in response to multiple samples of the monitored information acquired during a long monitoring period; or (v) estimating whether the monitored behavior pattern of the virtual machine substantially equals an expected (functional) behavior pattern, (vi) shut off the virtual machine.

Stage 150 can be followed by stage 170 of responding to the evaluation. Stage 170 can include at least one of the following: (i) amending a fault associated with a faulty state, (ii) amending a fault associated with a potentially faulty state, (iii) generating an alert, (iv) updating a definition of at least one state class; (iv) performing a virtual migration of the virtual machine, (v) generating a functional virtual machine indication, or (vi) altering a resource allocation scheme.

Figure 3:
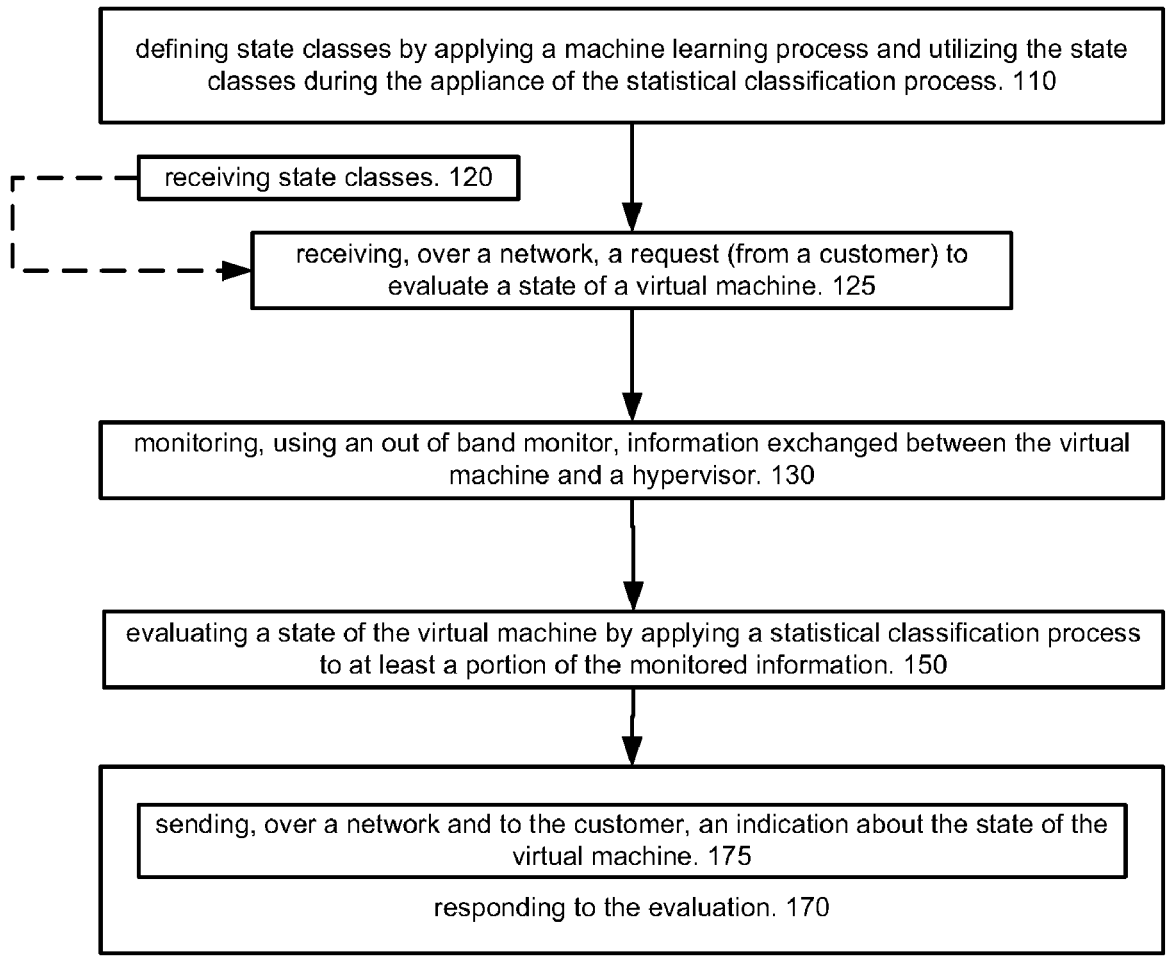
FIG. 3 is a flow chart of a method for providing a service to a customer over a network, according to an embodiment of the invention.

FIG. 3 is a flow chart of method 200 for providing a service to a customer over a network, according to an embodiment of the invention.

Method 200 differs from method 100 of FIG. 2 by including stages 125 and 175. Stage 125 precedes stage 130. It includes receiving, over a network, a request (from a customer) to evaluate a state of a virtual machine.

Stage 175 can be regarded as a part of stage 170, but this is not necessarily so. Stage 175 includes sending, over a network and to the customer, an indication about the state of the virtual machine.

Furthermore, the invention can take the form of a computer program product, accessible from a computer-usable or computer-readable medium, providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium, include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A computer program product is provided. The computer program product includes a computer usable medium including a computer readable program, wherein the computer readable program, when executed on a computer, causes the computer to: perform out of band monitoring of information exchanged between the virtual machine and a hypervisor; and evaluate a state of the virtual machine by applying a statistical classification process to at least a portion of the monitored information.

Conveniently, the computer readable program, when executed on a computer, causes the computer to monitor information representative of resource utilization by the virtual machine.

Conveniently, the computer readable program, when executed on a computer, causes the computer to define state classes by applying a machine learning process and to utilize the state classes during the appliance of the statistical classification process.

Conveniently, the computer readable program, when executed on a computer, causes the computer to generate, by applying a machine learning algorithm, a functional state class in response to an emulation of a functional virtual machine.

Conveniently, the computer readable program, when executed on a computer, causes the computer to classify the state of the virtual machine as being in one out of a functional states class, a faulty state class and a potentially faulty state class.

Conveniently, the computer readable program, when executed on a computer, causes the computer to assign a real number to each of the possible state classes, interpreted as a measure of the probability that it is the predicted class.

Conveniently, the computer readable program, when executed on a computer, causes the computer to define the state of the virtual machine as being a faulty state or a potentially faulty state if the state of the virtual machine is not in a functional state class.

Conveniently, the computer readable program, when executed on a computer, causes the computer to amend a fault associated with a faulty state, or with a potentially faulty state, if the state of the virtual machine is faulty or potentially faulty.

Conveniently, the computer readable program, when executed on a computer, causes the computer to amend a fault by performing a virtual migration of the virtual machine.

Conveniently, the computer readable program, when executed on a computer, causes the computer to evaluate the state of the virtual machine in response to multiple samples of monitored information acquired during a long monitoring period.

Conveniently, the computer readable program, when executed on a computer, causes the computer to generate classes of states in response to statistical characteristics of long term behavior patterns of the virtual machine.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for evaluating a virtual machine, the method comprising:
   applying a machine learning process to define multiple state classes for a virtual machine that is in communication with a hypervisor in a network,
      wherein said state classes are utilized to define a plurality of operational states for the virtual machine comprising at least one of a faulty state class and a potentially faulty state class,
      wherein the state classes are determined based on data collected from the virtual machine or other similarly situated virtual machines during a normal course of operation;
   monitoring information exchanged between the virtual machine and the hypervisor to determine whether the information exchanged provides any evidence of the virtual machine not operating in a normal operational state with respect to normal patterns of CPU utilization as determined by the machine learning process, and by evaluating a state of the virtual machine based on statistical analysis of at least a portion of the monitored information;
   performing a failure preventative or correction measure, in response to determining a potentially faulty or faulty state class.

2. The method according to claim 1 wherein the monitoring comprises monitoring, by an out of band monitor included within the hypervisor, information exchanged between the virtual machine and the hypervisor.

3. The method according to claim 1 wherein the monitoring comprises monitoring information representative of resource utilization by the virtual machine.

4. The method according to claim 1 further comprising defining state classes by applying the machine learning process and utilizing the state classes during the appliance of the statistical classification process.

5. The method according to claim 4 further comprising emulating a functional state of the virtual machine and generating a functional state class, by a machine learning entity.

6. The method according to claim 1 wherein the applying comprises defining the state of the virtual machine as being a faulty state or a potentially faulty state if the state of the virtual machine is not in a functional state class.

7. The method according to claim 1 further comprising amending a fault associated with a faulty state, or with a potentially faulty state, if the state of the virtual machine is faulty or potentially faulty.

8. The method according to claim 1 further comprising migrating the virtual machine if the state of the virtual machine is faulty or potentially faulty.

9. The method according to claim 1 wherein the evaluating is responsive to multiple samples of the monitored information acquired during a long monitoring period.

10. The method according to claim 1 wherein the classification is responsive to statistical characteristics of a long term behavior pattern of the virtual machine.

11. A computer program product comprising a non-transient computer usable data storage medium including a computer readable program, wherein the computer readable program, when executed on a computer, causes the computer to:
   apply a machine learning process to define multiple state classes for a virtual machine that is in communication with a hypervisor in a network,
      wherein said state classes are utilized to determine an operational state for the virtual machine comprising at least one of a faulty state class and a potentially faulty state class,
      wherein the state classes are determined based on data collected from the virtual machine or other similarly situated virtual machines during a normal course of operation;
   monitor information exchanged between the virtual machine and the hypervisor to determine whether the information exchanged provides any evidence of the virtual machine not operating in a normal operational state with respect to normal patterns of CPU utilization as determined by the machine learning process and by evaluating a state of the virtual machine based on statistical analysis of at least a portion of the monitored information; and
   perform a failure preventative measure, in response to detecting a potentially faulty state class for the virtual machine.

12. The computer program product according to claim 11, wherein the computer readable program, when executed on a computer, causes the computer to monitor information representative of resource utilization by the virtual machine.

13. The computer program product according to claim 11, wherein the computer readable program, when executed on a computer, causes the computer to define state classes by applying a machine learning process and to utilize the state classes during the appliance of the statistical classification process.

14. The computer program product according to claim 11, wherein the computer readable program, when executed on a computer, causes the computer to classify the state of the virtual machine as being in one out of a functional states class, a faulty state class and a potentially faulty state class.

15. The computer program product according to claim 11, wherein the computer readable program, when executed on a computer, causes the computer to define the state of the virtual machine as being a faulty state or a potentially faulty state if the state of the virtual machine is not in a functional state class.

16. The computer program product according to claim 11, wherein the computer readable program, when executed on a computer, causes the computer to amend a fault associated with a faulty state, or with a potentially faulty state, if the state of the virtual machine is faulty or potentially faulty.

17. The computer program product according to claim 11, wherein the computer readable program, when executed on a computer, causes the computer to amend a fault by performing a virtual migration of the virtual machine.

18. The computer program product according to claim 11, wherein the computer readable program, when executed on a computer, causes the computer to evaluate the state of the virtual machine in response to multiple samples of monitored information acquired during a long monitoring period.

19. The computer program product according to claim 11, wherein the computer readable program, when executed on a computer, causes the computer to generate classes of states in response to statistical characteristics of long term behavior patterns of the virtual machine.

20. A system having virtual machine evaluation capabilities, the system comprises:
a machine learning unit to define multiple state classes for a virtual machine that is in communication with a hypervisor in a network,
wherein said state classes are utilized to define a plurality of operation states for the virtual machine comprising a faulty state class and a potentially faulty state class,
wherein the state classes are determined based on data collected from the virtual machine or other similarly situated virtual machines during a normal course of operation and also when the virtual machines operate in a known faulty state;
an out of band monitor adapted to monitor information exchanged between the virtual machine and the hypervisor to determine whether the information exchanged provides any evidence of the virtual machine not operating in a normal operational state with respect to a normal pattern of CPU utilization associated with the virtual machine's utilization of a host machine's CPU; and
a statistical classifier adapted to evaluate a state of the virtual machine by applying a statistical classification process to at least a portion of the monitored information,
wherein said statistical classification process is based on said multiple classes defined during said machine learning process.

21. The system according to claim 20 wherein the out of band monitor is adapted to locate information representative of resource utilization by the virtual machine.

22. The system according to claim 20 wherein the out of band monitor is adapted to locate information representative of virtual machine requests to allocate resources.

23. The system according to claim 20 wherein the statistical classifier is adapted to define state classes by applying a machine learning process and to utilize the state classes during the appliance of the statistical classification process.

24. The system according to claim 20 wherein the statistical classifier is adapted to classify the state of the virtual machine as being in one out of a functional states class, a faulty state class and a potentially faulty state class.

25. The system according to claim 20 wherein the statistical classifier is adapted to define the state of the virtual machine as being a faulty state or a potentially faulty state if the state of the virtual machine is not in a functional state class.

26. The system according to claim 20 further adapted to generate an alert if the state of the virtual machine is faulty or potentially faulty.

27. The system according to claim 20 further adapted to amend a fault associated with a faulty state, or with a potentially faulty state, if the state of the virtual machine is faulty or potentially faulty.

28. The system according to claim 20 wherein the statistical classifier is adapted to evaluate the state of the virtual machine in response to multiple samples of monitored information acquired during a long monitoring period.

29. The system according to claim 20 wherein the statistical classifier is adapted to generate classes of states in response to statistical characteristics of long term behavior patterns of the virtual machine.

* * * * *